United States Patent
Kim

(10) Patent No.: US 9,569,103 B2
(45) Date of Patent: Feb. 14, 2017

(54) REMOTE CONTROL APPARATUS AND METHOD FOR PERFORMING VIRTUAL TOUCH BY USING INFORMATION DISPLAYED BY A PROJECTOR

(71) Applicant: VTouch Co., Ltd., Seoul (KR)

(72) Inventor: Seok-Joong Kim, Seoul (KR)

(73) Assignee: VTOUCH CO., LTD., Seoul (KR)

(*) Notice: Subject to any disclaimer, the term of this patent is extended or adjusted under 35 U.S.C. 154(b) by 0 days.

(21) Appl. No.: 14/404,635

(22) PCT Filed: May 28, 2013

(86) PCT No.: PCT/KR2013/004672
§ 371 (c)(1),
(2) Date: Dec. 1, 2014

(87) PCT Pub. No.: WO2013/180446
PCT Pub. Date: Dec. 5, 2013

(65) Prior Publication Data
US 2015/0145830 A1    May 28, 2015

(30) Foreign Application Priority Data

May 29, 2012 (KR) .................... 10-2012-0056993

(51) Int. Cl.
*G06F 3/0488* (2013.01)
*G06F 3/042* (2006.01)
(Continued)

(52) U.S. Cl.
CPC ......... *G06F 3/04883* (2013.01); *G06F 3/0346* (2013.01); *G06F 3/042* (2013.01);
(Continued)

(58) Field of Classification Search
CPC ........ G06F 3/0346; G06F 3/011; G06F 3/012; G06F 3/013; G06F 3/017; G06F 2203/04101; G06F 3/04815; G06F 2203/04808

See application file for complete search history.

(56) References Cited

U.S. PATENT DOCUMENTS 8,947,351 B1 * 2/2015 Noble ................ G06F 3/04883
345/156
2004/0242988 A1 * 12/2004 Niwa .................... A61B 6/467
600/407
(Continued)

FOREIGN PATENT DOCUMENTS

KR    10-0021803 B1    10/1986
KR    10-2004-0004135 A    1/2004
(Continued)

OTHER PUBLICATIONS

Ahn, Yang Keun, et al. "Implementation of interactive home control system." Proceedings of the 9th WSEAS international conference on computational intelligence, man-machine systems and cybernetics. See World Scientific and Engineering Academy and Society (WSEAS), pp. 203-208, Jul. 5, 2007.

*Primary Examiner* — Lixi C Simpson
(74) *Attorney, Agent, or Firm* — Revolution IP, PLLC

(57) ABSTRACT

Disclosed is a virtual touch remote control apparatus and method using user's movements (gestures) capable of control electronic devices remotely regardless of existence of a display on the device, by providing additional information display with a projector. The apparatus includes a 3D coordinates calculation unit, an electronic device detection unit, a user detection unit, an electronic device operation controller, and an electronic device information DB for storing device specific information.

12 Claims, 3 Drawing Sheets

(51) Int. Cl.
*G08C 17/00* (2006.01)
*G06F 3/0481* (2013.01)
*G06F 3/0346* (2013.01)
*G06F 3/01* (2006.01)

(52) U.S. Cl.
CPC ......... *G06F 3/04815* (2013.01); *G08C 17/00* (2013.01); *G06F 3/011* (2013.01); *G06F 3/017* (2013.01); *G06F 2203/04101* (2013.01); *G06F 2203/04808* (2013.01)

(56) References Cited

U.S. PATENT DOCUMENTS

2006/0241792 A1* 10/2006 Pretlove ................. G06Q 50/00
    700/83
2013/0300636 A1* 11/2013 Cunningham .......... G10L 13/02
    345/8

FOREIGN PATENT DOCUMENTS

| KR | 10-2007-0066382 A | 6/2007 |
| KR | 10-2007-0117877 A | 12/2007 |
| KR | 10-2010-0129629 A | 12/2010 |
| KR | 10-2012-0031805 A | 4/2012 |
| KR | 10-2013-0007813 A | 1/2013 |

\* cited by examiner

REMOTE CONTROL APPARATUS AND METHOD FOR PERFORMING VIRTUAL TOUCH BY USING INFORMATION DISPLAYED BY A PROJECTOR

CROSS REFERENCE TO PRIOR APPLICATIONS

This application is a National Stage Application of PCT International Patent Application No. PCT/KR2013/004672 filed on May 28, 2013, under 35 U.S.C. §371, which claims priority to Korean Patent Application No. 10-2012-0056993 filed on May 29, 2012, which are all hereby incorporated by reference in their entirety.

TECHNICAL FIELD

The present invention relates to an apparatus and method for remotely control electronic devices, and in particular, to a remote control apparatus and method for performing virtual touch capable of control electronic devices with a movement (gesture) of user's fingertips using information displayed by a projector.

BACKGROUND ART

The present invention starts on comparing touch panel technologies (operating without a cursor) with pointer technologies (operating with a cursor). The touch panel technologies have been widely used on various devices. Those touch panel technologies have an advantage of not requiring a pointer on display comparing with conventional pointer technologies such as mouse or trackballs for PC., that is, user directly place his/her finger onto icons without having to move a pointer (e.g. a mouse cursor) on screen to the corresponding locations to select a certain point on screen. Therefore, the touch panel technologies may perform faster and more intuitive operations for controlling devices by omitting "pointer producing and moving steps" which has been required on conventional pointing technologies.

However, the touch panel technology has a disadvantage in that may not be used remotely because the user needs to physically touch the surface of a display despite the above-described convenience. Therefore, additional remote controller is needed for control devices away from the devices.

Recently, a technology for remote control devices, like a touch panel technology, capturing the front of the display using two cameras capable of producing a pointer at correct spots and producing the pointer at a contact point on a display portion met by a line connecting eyes and fingers of the user from the captured images was disclosed in Korea unexamined patent application publication No. 2010-0129629 (published on Dec. 9, 2010).,
however, there are inconveniences in that it requires a pointer as preliminary measures for control and performing operations by comparing user's gestures with pre-stored patterns for specific operations. Further, there is a problem in that such operations are limited to the control of devices equipped with large displays since the icons should be large enough so that they can be distinguished from a distance. Further, there is another inconvenience in that it can only be operated when the user is positioned directly in the front of the device, so the user has to move to the specific location to perform an operation. Further, there is a problem in that since the prior arts controls devices through telecommunication among devices and camera controller, the devices should be placed on fixed locations and the system cannot used for control mobile devices.

DISCLOSURE

Technical Problem

An advantage of some aspects of the invention is that it provides a remote control apparatus and method capable of control electronic devices from a distance with a virtual touch system that operates by tracking user's body movements (gesture) regardless of existence of display on the device by projecting graphical information through a projector. Another advantage of some aspects of the invention is that it provides graphical information (virtual control panel) for controlling home appliances through a projector so that a user can control various devices at home regardless of their physical location without having to move close to the each device. Further another advantage of some aspects of the invention is that since the user controls devices through the information displayed by a projector, it is independent from the change of the location of the device and it can also be applied for control portable devices that are frequently moved around.

Technical Solution

According to an aspect of the invention, there is provided a remote control apparatus for performing virtual touch using information displayed by a projector including a 3D coordinates calculation unit for extracting 3D coordinates data of user's body and electronic devices; a device detection unit for displaying graphical information with a projector at locations that may be seen by the user by recognizing location information and device information of the electronic devices using the 3D coordinates data of the electronic devices calculated from the 3D coordinates calculation unit, and producing a virtual touch point region for performing virtual touch based on the direction information corresponding to a straight line between the user and displayed information by a projector; a user detection unit for calculating virtual touch points and change of the points thereof on the display projected by a projector for control electronic devices using the 3D coordinates data of user's body calculated from the 3D coordinates calculation unit, and producing command codes based on the change of the calculated virtual touch points for performing preliminarily set controls of the electronic devices; an electronic device operation controller for converting the produced command codes into control command signals, and transmitting the control command signals to the corresponding electronic devices when the command codes from the user detection unit are inputted; and an electronic device information DB for storing device specific information such as manufacturers, names, electronic devices data communication protocols for control of the electronic devices installed at home.

It is preferable that the 3D coordinates data of the electronic devices are set in advance.

It is preferable that the electronic device detection unit includes a projector modeling unit for performing projector modeling in accordance with the selected electronic devices based on the 3D coordinates from the 3D coordinates calculation unit, a projector configuration unit for displaying information at locations that may be seen by users for performing virtual touch based on the information displayed by a projector that includes the information, a touch location matching unit for matching the directional information of the user and the display projected by a projector to produce virtual touch point regions based on the directional information calculated from the projector configuration unit.

It is preferable that the projector configuration unit is set independently from the projector modeling unit and the touch location matching unit.

It is preferable that the user detection unit includes a touch location calculation unit for extracting a first space coordinates and a second space coordinates based on the 3D coordinates of the user's body calculated from the 3D coordinates calculation unit and calculating the contact point coordinates between the virtual touch point region calculated from the touch location matching unit, and the line connecting the first space coordinates (a finger) and the second space coordinates (an eye) calculated from the touch location calculation unit, and a virtual touch processing unit for determining whether there is a change on the contact point coordinates data calculated from the touch location calculation and producing the command codes preliminarily set for control electronic devices when there is a change.

It is preferable that the first space coordinates is the 3D coordinates of any one of the user's fingertips or the tip of a pointer grasped by the user's fingers, and the second space coordinates becomes the 3D coordinates of the midpoint of one of the user's eyes.

It is preferable that the virtual touch processing unit determines the status of contact point coordinates are changed if there is a variance in the contact point coordinates for more than certain preliminarily set period of time from the initial time when the contact point coordinates are first produced.

It is preferable that the virtual touch processing unit determines the status of the distance between the first space coordinates and the second space coordinates is changed if there is a variance in the distance for more than certain preliminarily set distance when there is no variance in the contact point coordinates for more than certain preliminarily set period of time from the initial time when the contact point coordinates are first produced, and producing preliminarily configured command codes for control electronic devices if the status of the distance is defined as changed.

According to another aspect of the invention, there is provided a remote control method for performing virtual touch using information displayed by a projector including (A) extracting 3D coordinates data of user's body and electronic devices; (B) using the extracted 3d coordinates data of electronic devices, detecting the corresponding electronic devices based on the preliminarily stored device information, and displaying the information with a projector at the locations that may be seen by users for performing operations of the electronic devices; (C) detecting the corresponding electronic devices by comparing the pre-stored electronic device information with the projector-modeled electronic devices, and configuring control signals for controlling the detected electronic devices; (D) producing a virtual touch point region for virtual touch by matching the directional information corresponding to a straight line between the user and the display projected by a projector based on the calculated 3D coordinates data of the user's body; (E) calculating a first space coordinates having 3D coordinates of any one of the user's fingertips and a second space coordinates having 3D coordinates of a midpoint of any one of user's eyes, using 3D coordinates data of the user's body from the calculated 3D coordinates data, and calculating a contact point coordinates between the virtual touch point region and the line connecting the first space coordinates and the second space coordinates; (F) if there is changes on the contact point coordinates, producing command codes for control electronic devices corresponding to the preliminarily configured control to the changes by detecting variances on the contact point coordinates; and (G) converting the produced command codes into control command signals for control the corresponding electronic devices and transmitting the control command signals to the corresponding electronic devices.

It is preferable that the (F) determining the status of the contact point coordinates as changed if there is a variance in the contact point coordinates for more than certain preliminarily set period of time from the initial time when the contact point coordinates are first produced.

It is preferable that the (F) determining the status of the distance between the first space coordinates and the second space coordinates as changed if there is a variance in the distance for more than certain preliminarily set distance when there is no variance in the contact point coordinates for more than certain preliminarily set period of time from the initial time when the contact point coordinates are first produced, and producing preliminarily configured command codes for control the electronic devices if the status of the distance is defined as changed.

It is preferable that the (F) includes setting the virtual touch region for virtual touch to the control the display projected by the projector based on the information preliminarily stored on the electronic device information DB, calculating the contact point coordinates between the virtual touch point region, and the line connecting the first space coordinates and the second space coordinates, and when the user performs virtual touch by moving a finger at least one of up, down, left, right, front and back on the touch point region displayed by a projector, and if change on the contact point coordinates is detected, producing command codes for control electronic devices corresponding to the preliminarily configured control to the changes by detecting variances of the contact point coordinates from the initial contact point coordinates.

Advantageous Effects

According to an embodiment of the present invention, a remote control apparatus and method capable of performing virtual touch using information displayed by a projector of the present invention have the following effects.

Firstly, it enables fast control of electronic devices since it allows users control devices not by clicking icons on display but by pointing directly at the device itself. And in consequences, it can also be applied to control devices not having displays.

Secondly, prior studies and technologies are limited to control devices with displays. The present invention provides a new touch recognition method capable of control devices without displays and allows precise operation for controlling electronic devices. Thirdly, the remote control apparatus is configured independently with the electronic devices being controlled, thereby capable of extracting the 3D space coordinates even when there is a changes on location of the electronic devices, and therefore, it can be applied to control mobile devices.

Fourthly, it is possible to provide the virtual touch not only to the electronic device but also to control non electronic devices requiring simple on/off controls such as curtains, lightings, automatic door locks, etc. by 3D modeling the non electronic devices, and configuring to perform virtual touch corresponding to the virtual touch controls, and possibly be applied to control various other devices.

BEST MODE

Another purposes, characteristics and advantages of the present invention will be apparent by the detailed descriptions of the embodiments with reference to the attached drawings.

An exemplary embodiment for the remote control apparatus and method performing virtual touch using information displayed by a projector according to the present invention will be described with reference to the attached drawings as follows. However, although the present invention is described by specific matters such as concrete components and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description. Therefore, the spirit of the present invention should not be limited to the above-described exemplary embodiments and the following claims as well as all modified equally or equivalently to the claims are intended to fall within the scopes and spirit of the invention.

MODE FOR INVENTION

Figure 1:
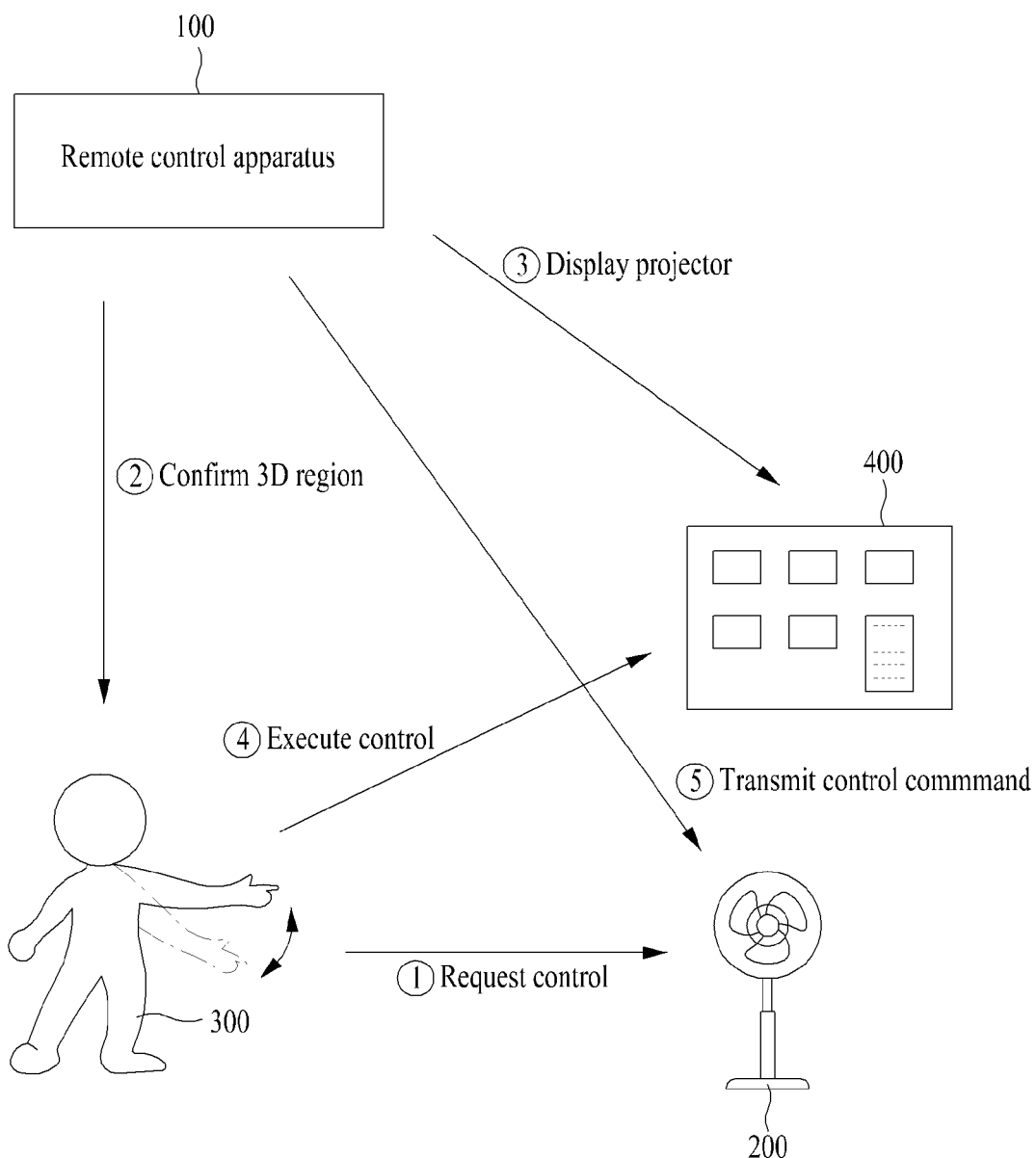
FIG. 1 shows a whole system of a remote control apparatus performing virtual touch using information displayed by a projector according to an embodiment of the present invention.

FIG. 1 shows a whole system of a remote control apparatus performing the virtual touch using information displayed by the projector according to an embodiment of the present invention.

As shown in FIG. 1, when a user requests control of the electronic devices 200 using the virtual touch through a movement (gesture) of hands, etc. (①), the remote control apparatus 100 extracts a 3D coordinates data of user's body through the movement of the user and confirms a 3D region (②), and simultaneously recognizes the electronic devices 200 requesting the control by the user. Further, the projector 400 included with information, menu, button, etc. for performing functions of the recognized electronic devices 200 is displayed at locations that may be seen by the user (③). Then, when any one of information, menu, button, etc. displayed on the projector 400 by the virtual touch through the movement (gesture) of the user is selected and the control of the electronic devices 200 is executed (④), the corresponding electronic devices 200 is controlled by producing control command signals for the electronic devices corresponding to the movement of the user and transmitting the produced signals to the corresponding electronic devices 200 (⑤).

Auxiliary information for performing the functions of the electronic devices is separately displayed by the projector, the remote control is performed on the information displayed by a projector, and it is possible to apply to all electronic devices controlled using a prior remote controller regardless of existence of display on the electronic devices 200.

Hereinafter, configurations of the remote control apparatus 100 are described in more detail.

Figure 2:
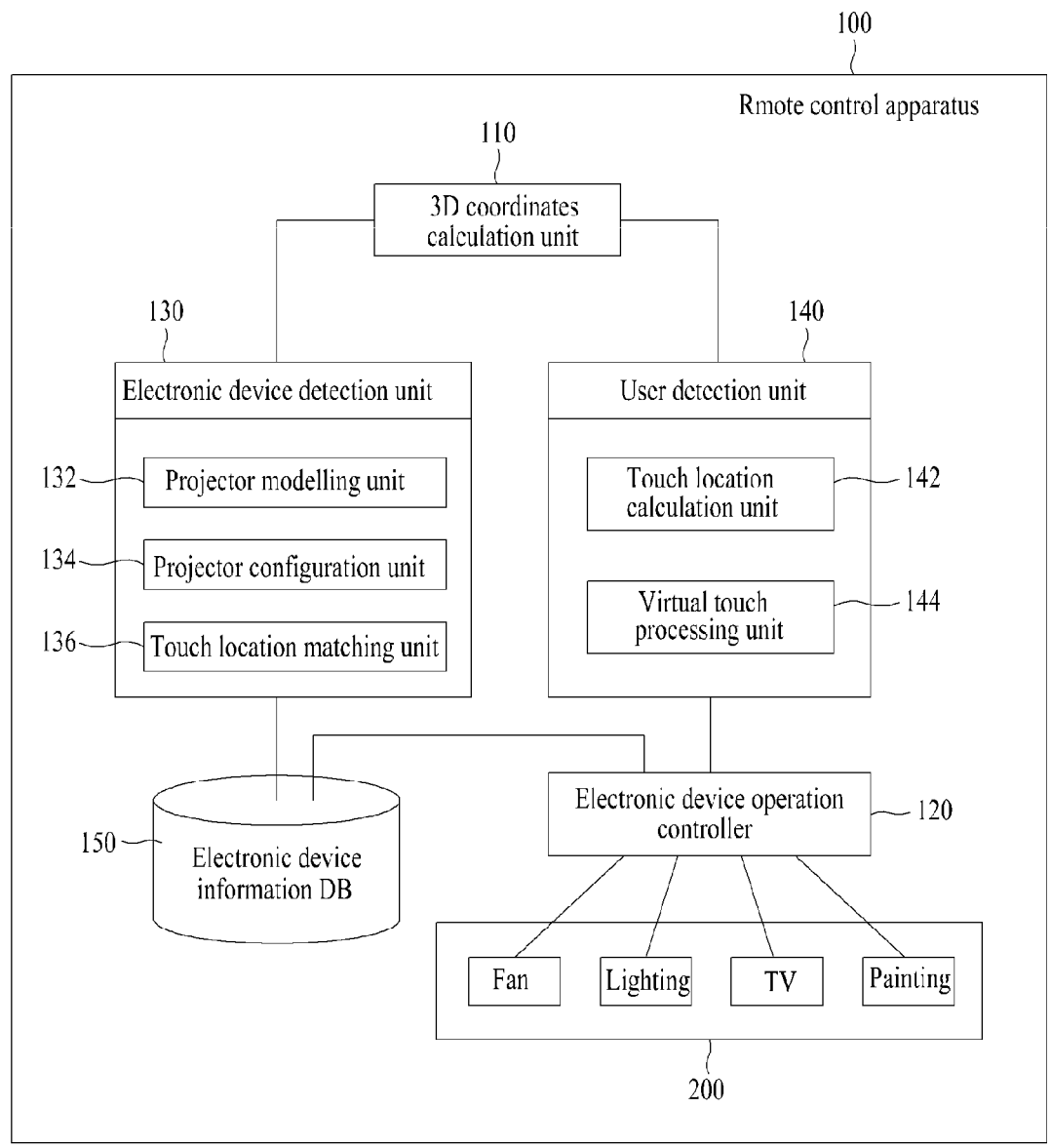
FIG. 2 is a block view for the remote control apparatus performing the virtual touch using information displayed by a projector according to the embodiment of the present invention.

FIG. 2 is a block view for the remote control apparatus performing virtual touch using information displayed by a projector according to the embodiment of the present invention.

The remote control apparatus 100 shown in FIG. 2 includes a 3D coordinates calculation unit 110, an electronic device operation controller 120, an electronic device detection unit 130, a user detection unit 140 and electronic device information DB 150.

The 3D coordinates calculation unit 110 may calculate 3D coordinates of the user's body and electronic devices by prior known various 3D coordinates extraction methods. At this time, the 3D coordinates calculation for the electronic devices may be calculated using images captured by a camera, but the 3D coordinates data for the fixed locations are preliminarily set and may be used as the 3D coordinates for the electronic devices because the electronic devices at home are generally fixed on certain locations.

Representative schemes for 3D coordinates extraction are, for example, an optical triangulation scheme, a Time of Flight scheme and measurement using a structured light.

The optical triangulation scheme calculates 3D coordinates data from the images obtained by two cameras captured at angles different from each other, and a camera self calibration technique, a corner extraction method of Harris, a SIFT technique, a RANSAC technique, a Tsai technique, etc. are adapted to various relevant technique extracting the 3D coordinates using the triangulation scheme. Further, the Time of Flight scheme divides time difference, that ultrasonic waves generated from a transmitter are reflected from objects and the reflected ultrasonic waves reach a receiver, by travel speed of the ultrasonic waves and transforms the divided it into distances to obtain the 3D coordinates data. Further, the measurement using a structured light continually projects coded pattern images and obtains the images of the scenes projected with the structured light by the camera to estimate 3D locations. Besides, the 3D coordinates calculation methods are variously present in prior arts, many 3D coordinates calculation method mentioned above may be easily implemented by those skilled in the art to which the present invention pertains, and therefore the description about them is omitted. On the other hand, methods for calculating the 3D coordinates data using 2D images are disclosed in Korea Unexamined Patent Application Publication No. 10-0021803, 10-2004-0004135, 10-2007-0066382 and 10-2007-0117877.

The electronic device detection unit 130 configured with a projector modeling unit 132, a projector configuration unit 134 and a touch location matching unit 136 recognizes space location information for the electronic devices 200 and information of device products using the 3D coordinates data for the electronic devices calculated from the 3D coordinates calculation unit 110, displays the projector at locations that may be seen by the user, and produces virtual touch point regions for the virtual touch between between the user and projector based on direction information corresponding to a straight line between the user and projector.

At that time, the projector modeling unit 132 performs projector modeling for the electronic devices selected based on the 3D space coordinates for the electronic devices calculated from the 3D coordinates calculation unit 110. It is said that the projector modeling detects the corresponding electronic devices by comparing with information of the electronic appliances pre-stored into the electronic appliance information DB 150, and forms the projector having auxiliary information included with information, menu, button, etc. for performing functions of the detected electronic devices. In addition, the projector setting unit 134 displays the projector included with information, menu, button, etc. for performing functions of the electronic devices modeled by the projector modeling unit 132 at the locations that may be seen by the user. At this time, the projector setting unit 134 may be located inside the electronic device detection unit 130, but may use projector device available for general purpose at present. The applicable projector devices are, for example, CRT (Cathode Ray Tube) projector, LCD (Liquid Crystal Display) projector, DLP (Digital Light Processing) projector, SXRD (Silicon X-tal Reflective Display) projector, Laser projector. Further, the touch location matching unit 136 matches the direction information, from each other, corresponding to the straight line between the user and projector, and produces a virtual 2D contact touch region for the virtual touch between the user and projector based on the matched direction information. That is, since the projector modeling unit 132 may in advance know auxiliary information and location information thereof, the 2D touch point region produced by the touch location matching unit 136 may specify any one of the auxiliary information displayed by the projector.

The user detection unit 140 configured with a touch location calculation unit 142 and a virtual touch processing unit 144 calculates virtual touch locations and change of the locations thereof of the projector controlling the electronic devices 200 using the 3D coordinates data of the user's body calculated from the 3D coordinates calculation unit 110, and produces command codes controlling the electronic devices preliminarily set based on change of the calculated virtual touch locations.

At this time, the touch location calculation unit 142 calculates a first space coordinates and a second space coordinates based on the 3D space coordinates of the user's body calculated from the 3D coordinates calculation unit 110, and calculates contact point coordinates data on the virtual touch point region, produced by the touch location matching unit 136, met with a line connecting the first space coordinates and the second space coordinates using the calculated first space coordinates (a finger) and the second space coordinates (an eye).

In general, the fingers of a human body are the only part capable of performing exquisite and delicate controls. In particular, an exquisite pointing may be performed on using any one of a thumb or a forefinger of fingers or together with the two fingers. Therefore, it is very effective to use trailing ends of the thumb and/or the forefinger as the first space coordinate (B) in the present invention. Further, in the same context, a pointer (for example, a pen tip) having a sharp tip grasped by the fingers may be used instead of the trailing end of the fingers performing a role of the first space coordinate (B).

In addition, in the present invention, a midpoint only of one eye of the user is used as the second space coordinates (A). For example, when the user looks the thumb in front of two eyes, the thumb will look as two. This is caused (by angle difference between both eyes) because shapes of the thumb, that both eyes of the user respectively look, are different from each other. However, if only one eye looks the thumb, the thumb will be clearly looked. In addition, although not closing one eye, the thumb will be markedly looked even on consciously looking by one eye. To aim with one eye closed also follows the above principle in case of game of sports such as fire, archery, etc. requiring high accuracy on aiming. When only one eye (the second space coordinates) only looks a tip of his/her finger (the first space coordinates) in the present invention, the principle capable of markedly apprehending the shape of the tip of his/her finger is used. The user should accurately look the first space coordinates (B), and therefore may point the virtual touch point region produced from the touch location matching unit 136 coincident with the first space coordinates (B).

On the other hand, when one user uses any one of his/her fingers in the present invention, the first space coordinates is any one 3D coordinates of the tip of any one of the fingers of the user or the tip of the pointer grasped by the fingers of the user, and the second space coordinates becomes the 3D coordinates for the midpoint of any one eye of the user. Further, when one user uses at least two of the fingers, the first space coordinates is formed as the 3D coordinates for the tips of at least two of the fingers of the user and the second space coordinates is formed as the 3D coordinates for the midpoint of any one eye of the user. Further, when at least two user use at least two of the fingers, the first space coordinates is formed as the 3D coordinates for the tip of the finger for each user suggested by at least two users and the second space coordinates is formed as the 3D coordinates for the midpoint of any one eye of at least two users.

The virtual touch processing unit 144 determines the status of contact point coordinates are changed if there is a variance in the contact point coordinates for more than certain preliminarily set period of time from the initial time when the contact point coordinates are first produced, and produces command codes performing operations set to be corresponded to the contact point coordinates when the contact point coordinates data are changed. Further, the virtual touch processing unit 144 may be processed for two fingers of one user or at least two users by the same schemes.

The virtual touch processing unit 144 determines whether the contact point coordinates data are varied from time calculated by the initial contact point coordinates data to the set time, determines the status of the distance between the first space coordinates and the second space coordinates is changed if there is a variance in the distance for more than certain preliminarily set distance when there is no variance in the contact point coordinates for more than certain preliminarily set period of time from the initial time when the contact point coordinates are first produced, and producing preliminarily configured command codes for control electronic devices if the status of the distance is defined as changed. Further, the virtual touch processing unit 144 may be processed for two fingers of one user or at least two users by the same schemes.

On the other hand, when it is determined that the contact point coordinates data are varied within the set range, it may be regarded that the contact point coordinates data are not varied. That is, when the user points the electronic devices by the tip of his/her fingers or pointer, there are some movements or tremors of his/her body or fingers due to physical characteristics and therefore it is very difficult to intactly maintain the contact coordinates by the user. Therefore, it is regarded that the contact point coordinates data are not varied when the contact point coordinate data values are within the predefined set range.

The electronic devices becoming targets for remote control according to the present invention are lighting, speaker, air conditioner, fan, blind, window, curtain, door, heating appliance, gas appliance, electronic range, video machine, camera and CCTV, etc. that may configure home networking, and various electronic devices or art works such as paintings and sculptures may become targets for remote control according to the present invention. That is, menus for menu selection and control of the electronic devices, etc. are displayed on the projector by remote control in case of various electronic devices, and text information for description about the corresponding art works and artists in case of the art works are displayed on the projector. Further, auxiliary information combined with the menus and text information is displayed on the projector.

The remote control apparatus 100 according to the present invention is separated from the electronic devices becoming the targets of the remote control or the projector to be outputted is separately displayed from the electronic devices becoming the targets of the remote control such that the 3D space coordinates varied for the electronic devices are freely calculated on moving the electronic devices and the remote control apparatus 100 may be applied to various electronic devices having free mobility.

When the command codes produced from the user detection unit 140 are inputted, the electronic device operation controller 120 converts the inputted command codes into control command signals for controlling the corresponding electronic devices to transmit the control command signals to the corresponding electronic appliances. At this time, it is preferable that the control command signals to be transmitted are transmitted as infrared rays (IR) signals at a prior remote controller, but are not limited thereto, and it is natural that the control command signals may be applied to short distance wireless communication schemes such as WiFi, Bluetooth, etc. being used at present.

The electronic device information DB 150 stores device product information such as manufacturer and model name of the electronic devices installed at home, protocol information applied to the control of each device product, and control information for each electronic device.

The control information refers to the control information of the electronic devices such as power, illuminance, volume, temperature control, etc. of the electronic devices. For reference, information stored into the electronic device information DB 150 may be frequently updated by the user after purchasing the electronic devices, and it is possible to download information of the corresponding electronic devices after connecting to a website of home appliances or to download and update information for the corresponding electronic devices through a transceiver in advance configured in the electronic devices by a method updating information.

Further, text, image information, etc. for description and writer, etc. about the corresponding artworks may be stored without limiting various electronic devices.

Operations of the virtual touch apparatus for performing the virtual touch using information displayed by the projector, according to the present invention, configured as above are described with reference to the attached drawings. Like reference numbers in FIG. 1 and FIG. 2 refer to like members performing the same functions.

Figure 3:
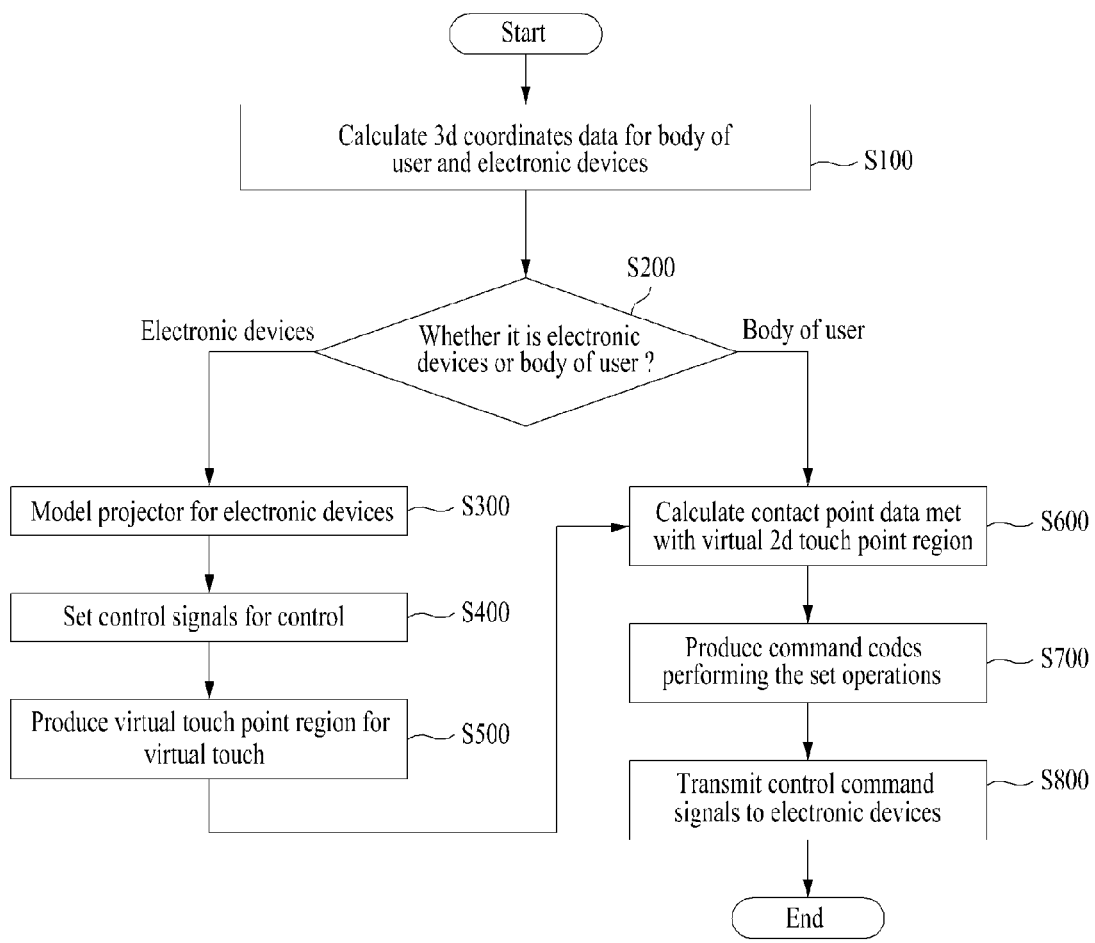
FIG. 3 is a flow chart for a remote control method performing the virtual touch using information displayed by a projector according to the embodiment of the present invention.

FIG. 3 is a flow chart for describing a remote control touch method for performing the virtual touch using information displayed by the projector according to the embodiment of the present invention.

Referring to FIG. 3, it calculates the 3D coordinates data of the user's body and electronic devices captured by at least one camera by the optical triangulation scheme, the Time of Flight scheme or measurement using the structured light (S100). At this time, although the 3D coordinates data for the electronic devices may be calculated using the images captured by the camera, the electronic devices at home are fixed at specific locations and therefore the 3D coordinates data for the fixed locations are in advance set to use as the 3D coordinates for the electronic devices.

It detects the corresponding electronic devices, based on the electronic device information DB 150, using the 3D coordinates data for the electronic devices of the calculated 3D coordinates data, and it models the projector 400 included with information, menu, button, etc. for performing the functions of the detected electronic devices 200 to display the projector 400 at the locations that may be seen by the user (S300).

Further, it detects the corresponding electronic devices as compared with information for the electronic devices in advance stored into the electronic device information DB 150 by the electronic device setting unit 134 based on projector-modeled electronic devices, and sets control signals for controlling the detected electronic devices (S400).

In addition, the touch location matching unit 136 matches direction information, from each other, corresponding to the straight line between the user and projector based on the extracted 3D coordinates data of the user's body, and produces a virtual 2D touch point region for the virtual touch between the user and projector based on the direction information to be matched (S500). The produced virtual 2D touch point region is separated from the electronic devices becoming the targets of the remote control, and refers to the scenes of the projector displayed at the locations that may be seen by the user.

On the other hand, it calculates a first space coordinates having the 3D coordinates for the tip of any one finger of the fingers of the user and a second space coordinates having the 3D coordinates for the midpoint of any one eye of the user, using the 3D coordinates data of the user's body of the calculated 3D coordinates data, and calculates contact point coordinates data for the 2D touch point region of the produced projector met with the line connecting the first space coordinates and second space coordinates (S600).

In general, the fingers of a person's body are an only part capable of performing exquisite and delicate controls. In particular, an exquisite pointing may be performed on using any one of a thumb or a forefinger of fingers or together with the two fingers. Therefore, it is very effective to use trailing ends of the thumb and/or the forefinger as the first space coordinate (B) in the present invention. Further, in the same context, a pointer (for example, a pen tip) having a sharp tip grasped by the fingers may be used instead of the trailing end of the fingers performing a role of the first space coordinate (B).

In addition, in the present invention, a midpoint only of one eye of the user is used as the second space coordinates (A). For example, when the user looks the thumb in front of two eyes, the thumb will look as two. This is caused (by angle difference between both eyes) because shapes of the thumb, that both eyes of the user respectively look, are different from each other. However, if only one eye looks the thumb, the thumb will be clearly looked. In addition, although not closing one eye, the thumb will be markedly looked even on consciously looking by one eye. To aim with one eye closed also follows the above principle in case of game of sports such as fire, archery, etc. requiring high accuracy on aiming.

When only one eye (the second space coordinates) only looks a tip of the finger (the first space coordinates) in the present invention, the principle capable of markedly apprehending the shape of the tip of the finger is used. The user should accurately look the first space coordinates (B), and therefore may point the virtual touch point region produced from the touch location matching unit 136 coincident with the first space coordinates (B). Further, when one user uses at least two of the fingers, the first space coordinates is formed as the 3D coordinates for the tips of at least two of the fingers of the user and the second space coordinates is formed as the 3D coordinates for the midpoint of any one eye of the user. Further, when at least two user use at least two of the fingers, the first space coordinates is formed as the 3D coordinates for the tip of the finger for each user suggested by at least two users and the second space coordinates is formed as the 3D coordinates for the midpoint of any one eye of at least two users.

In addition, the virtual touch processing unit 144 determines whether the contact point coordinates data for the produced virtual 2D touch point region are varied, and produces the command codes performing the auxiliary information included with information, menu, button, etc. for performing the functions of the electronic devices preset to be corresponded to variation of the contact point coordinates data on varying (S700).

At that time, the virtual touch processing unit 144 sets a touch region for the virtual touch control according to the control information pre-stored into the electronic device information DB at the 2D touch point region for the produced projector, and calculates the contact point coordinates data at the 2D touch point region for the produced projector met with the line connecting the first and second space coordinates. In addition, when the user performs virtual touch by moving a finger at least one of up, down, left, right, front and back on the touch point region displayed by a projector, and if change on the contact point coordinates is detected, producing command codes for control electronic devices corresponding to the preliminarily configured control to the changes by detecting variances of the contact point coordinates from the initial contact point coordinates. The virtual touch processing unit 144 determines whether the contact point coordinates data are varied from time produced with the initial contact point coordinates data to the set time.

In addition, it determines whether the contact point coordinates data are varied from time produced with the initial contact point coordinates data to the set time, determines whether the distance variation above the distance set between the first space coordinates and second space coordinates is generated when the contact point coordinates data are not varied above the set time, and determines that there is a variation for the contact point coordinates data when the distance variation above the set distance is generated. It produces the command codes performing operations set to be corresponded to the varied contact point coordinates data in the case that there is a variation for the contact point coordinates data.

It convert the produced command codes into the control command signals for controlling the corresponding electronic devices and transmits the converted control command signals to the corresponding electronic devices (S800). Although it is desirable that the transmitted control command signals are transmitted as the infrared rays (IR) signals at the prior remote controller, it is not limited thereto and it is possible to transmit by the short distance wireless communication scheme such as WiFi, Bluetooth, etc. being used.

Although the present invention has been shown and described with the exemplary embodiment as described above, the present invention is not limited to the exemplary embodiment as described above, but may be variously changed and modified by those skilled in the art to which the present invention pertains without departing from the scope of the present invention. Accordingly, the actual technical protection scope of the present invention must be determined by the spirit of the appended claims.

INDUSTRIAL APPLICABILITY

The present invention relates to a remote control apparatus and method performing the virtual touch using information displayed by the projector, and may quickly control electronic devices and may be also applied to all electronic devices having no a display device. Further, the present invention may provide a new touch recognition method capable of correctly controlling operations of the electronic devices while using a virtual touch device not using the display device.

The invention claimed is:
1. A remote control apparatus for performing virtual touch by using information displayed by a projector, comprising:
a 3D coordinates calculation unit for extracting 3D coordinates data of user's body parts and one or more electronic devices;
an electronic device detection unit for displaying information with a projector at locations by determining spatial location information and product information of electronic devices using the 3D coordinates data of the electronic devices calculated from the 3D coordinates calculation unit, and
producing a virtual touch point region for virtual touch based on direction information corresponding to a straight line calculated based on the extracted 3D coordinates data between the user and the display projected by a projector;
a user detection unit for calculating virtual touch points and detecting change of the touch points on the display projected by a projector for control electronic devices using the 3D coordinates data of user's body parts calculated from the 3D coordinates calculation unit, and generating command codes based on the change of the calculated virtual touch points for performing preliminarily set controls of the electronic devices;
an electronic device operation controller for converting the produced command codes into control command signals, and
transmitting the control command signals to the corresponding electronic devices in response to detection of an input of the command codes from the user detection unit; and
an electronic device information database (DB) for storing device specific information comprising at least one of manufacturers, names, and electronic devices data communication protocols for control of the electronic devices installed at home.
2. The remote control apparatus for performing virtual touch by using information displayed by a projector according to claim 1, wherein the 3D coordinates data of the electronic devices are set in advance.

3. The remote control apparatus for performing virtual touch by using information displayed by a projector according to claim 1, wherein
the electronic device detection unit includes a projector modeling unit for performing projector modeling in accordance with the selected electronic devices based on the 3D coordinates from the 3D coordinates calculation unit,
a projector configuration unit for displaying information at locations for performing virtual touch based on the information projected by a projector that includes the information, and
a touch location matching unit for matching the directional information of the user and the display projected by a projector to produce virtual touch point regions based on the directional information calculated from the projector configuration unit.

4. The remote control apparatus for performing virtual touch by using information displayed by a projector according to claim 3, wherein the projector configuration unit is set independently from the projector modeling unit and the touch location matching unit.

5. The remote control apparatus for performing virtual touch by using information displayed by a projector according to claim 3, wherein
the user detection unit includes a touch location calculation unit for extracting a first space coordinates and a second space coordinates based on the 3D coordinates of the user's body parts calculated from the 3D coordinates calculation unit and calculating the contact point coordinates between the virtual touch point region calculated from the touch location matching unit, and the line connecting the first space coordinates (a finger) and the second space coordinates (e.g., an eye) calculated from the touch location calculation unit, and
a virtual touch processing unit for determining whether there is a change on the contact point coordinates data calculated from the touch location calculation and producing the command codes preliminarily set for control electronic devices when there is a change.

6. The remote control apparatus for performing virtual touch by using information displayed by a projector according to claim 5, wherein
the first space coordinates is the 3D coordinates of any one of the user's fingertips or the tip of a pointer grasped by the user's fingers, and the second space coordinates becomes the 3D coordinates of the midpoint of one of the user's eyes.

7. The remote control apparatus for performing virtual touch by using information displayed by a projector according to claim 5, wherein
whether the status of contact point coordinates being changed, by the virtual touch processing unit, is determined in response to detection whether there is a variance in the contact point coordinates for more than certain preliminarily set period of time from the initial time when the contact point coordinates are first produced.

8. The remote control apparatus for performing virtual touch by using information displayed by a projector according to claim 7, wherein
whether the status of the distance between the first space coordinates and the second space coordinates being changed, by the virtual touch processing unit, is determined in response to detection whether there is a variance in the distance for more than certain preliminarily set distance when there is no variance in the contact point coordinates for more than certain preliminarily set period of time from the initial time when the contact point coordinates are first produced, and
producing preliminarily configured command codes for control electronic devices in response to detection of the status of the distance being changed.

9. The remote control method for performing virtual touch by using information displayed by a projector, comprising:
extracting 3D coordinates data of user's body parts and one or more electronic devices;
upon detection of the extracted 3d coordinates data of electronic devices, detecting the corresponding electronic devices based on the preliminarily stored device information, and displaying the information with a projector at the locations for performing operations of the electronic devices;
detecting the corresponding electronic devices by comparing the pre-stored electronic device information with the projector-modeled electronic devices and configuring control signals for controlling the detected electronic devices;
producing a virtual touch point region for virtual touch by matching the directional information corresponding to a straight line between the user and the display projected by a projector based on the calculated 3D coordinates data of the user's body parts;
calculating a first space coordinates having 3D coordinates of any one of the user's fingertips and a second space coordinates having 3D coordinates of a midpoint of any one of user's eyes, using 3D coordinates data of the user's body parts from the calculated 3D coordinates data, and calculating a contact point coordinates between the virtual touch point region and the line connecting the first space coordinates and the second space coordinates;
in response to detection whether there is changes on the contact point coordinates, producing command codes for control electronic devices corresponding to the preliminarily configured control to the changes by detecting variances on the contact point coordinates; and
converting the produced command codes into control command signals for control the corresponding electronic devices and transmitting the control command signals to the corresponding electronic devices.

10. The remote control method for performing virtual touch by using information displayed by a projector, according to claim 9, wherein the the contact point coordinates is changed in response to detection of a variance in the contact point coordinates for more than certain preliminarily set period of time from the initial time when the contact point coordinates are first produced.

11. The remote control method for performing virtual touch by using information displayed by a projector according to claim 9,
when upon detection of no variance in the contact point coordinates for more than certain preliminarily set period of time from the initial time when the contact point coordinates are first produced,
the status of the distance between the first space coordinates and the second space coordinates are changed in response to detection of a variance in the distance for more than certain preliminarily set distance.

12. The remote control method for performing virtual touch by using information displayed by a projector according to claim 9, further comprising:

setting the virtual touch region for virtual touch to control the display projected by the projector based on the information preliminarily stored on the electronic device information DB, calculating the contact point coordinates between the virtual touch point region, and the line connecting the first space coordinates and the second space coordinates, and in response to detection of virtual touch by moving a finger at least one of up, down, left, right, front and back on the touch point region displayed by a projector, and in response to detection of a change on the contact point coordinates, producing command codes for control electronic devices corresponding to the preliminarily configured control to the changes by detecting variances of the contact point coordinates from the initial contact point coordinates.

* * * * *